United States Patent [19]
Alexeev

[11] 3,747,424
[45] July 24, 1973

[54] VARIABLE SPEED REDUCER
[75] Inventor: Kirill M. Alexeev, New York, N.Y.
[73] Assignee: Jacques Gourevitch, New York, N.Y. ; a part interest
[22] Filed: Feb. 28, 1972
[21] Appl. No.: 229,675

Related U.S. Application Data
[63] Continuation-in-part of Ser. No. 78,085, Oct. 5, 1970, abandoned.

[52] U.S. Cl. .................................. 74/425.5, 74/191
[51] Int. Cl. .......................... F16h 1/16, F16h 15/16
[58] Field of Search .................... 74/191, 425.5, 425

[56] References Cited
UNITED STATES PATENTS
| | | | |
|---|---|---|---|
| 1,397,494 | 11/1921 | Strong | 74/191 X |
| 2,526,435 | 10/1950 | Teigman | 74/191 |
| 2,715,164 | 8/1955 | Hufnagel | 74/191 X |
| 3,176,534 | 4/1965 | Rice et al. | 74/425 |

*Primary Examiner*—Leonard H. Gerin
*Attorney*—Karl F. Ross

[57] ABSTRACT

A worm rigid with an input shaft bites into the surface of a tapering elastomeric body (e.g. of neoprene), with straight or arcuate generatrices, connected to an output shaft. The worm is journaled in a carriage which is displaceable, manually or automatically, along a generatrix of the tapering body to vary the step-down radio between the two shafts.

6 Claims, 4 Drawing Figures

PATENTED JUL 24 1973 3,747,424

VARIABLE SPEED REDUCER

This application is a continuation-in-part of my copending application Ser. No. 78,085 filed October 5, 1970, now abandoned.

My present invention relates to a variable speed changer, more specifically a speed reducer, for the transmission of torque from an input shaft connected to a rotary drive means to an output shaft connected to a load.

The general object of this invention is to provide a compact speed reducer whose step-down ratio may be varied continuously within wide limits, e.g. between 1:5 and 1:500.

A more particular object is to provide means in such a speed reducer for enabling a progressive change of the ratio according to a predetermined law, linear or other, as a function of time, speed or some other controlling variable.

A speed reducer according to my invention comprises a tapering body of elastomeric material, preferably neoprene, journaled on a support for rotation about its axis, this body taking the place of a worm wheel and being engaged by a worm whose axis is skew to the body axis and whose threads bite into the elastomeric material thereof along a generatrix of that body. The worm is journaled in a holder which is adjustably mounted on the support to allow a displacement of the worm, parallel to itself, along that generatrix; the relative position between the worm and the elastomeric body is determined by control means which may be operated manually or automatically to establish a desired speed ratio or to vary that ratio in a predetermined manner.

In the simplest cases, the generatrices of the rotating body are either straight or arcuately curved so that the worm holder may be slidably guided or pivotally mounted for swinging about the center of curvature of the engaged generatrix. In the first instant this holder may be a carriage with a nut in mesh with a leadscrew having threads of the self-locking type; the leadscrew may be manually rotated or driven, continuously or intermittently, by a power source which could be the motor driving the input shaft of the speed reducer itself. In a particularly advantageous embodiment of this type, designed to provide an exponentially increasing or decreasing speed ratio, the leadscrew may be coupled with the output shaft for rotation at the speed of the elastomeric body; such a system may be used, for example, as a starter for an internal-combustion engine.

The invention will be described in full detail hereinafter with reference to the accompanying drawing in which.

Figure 1:
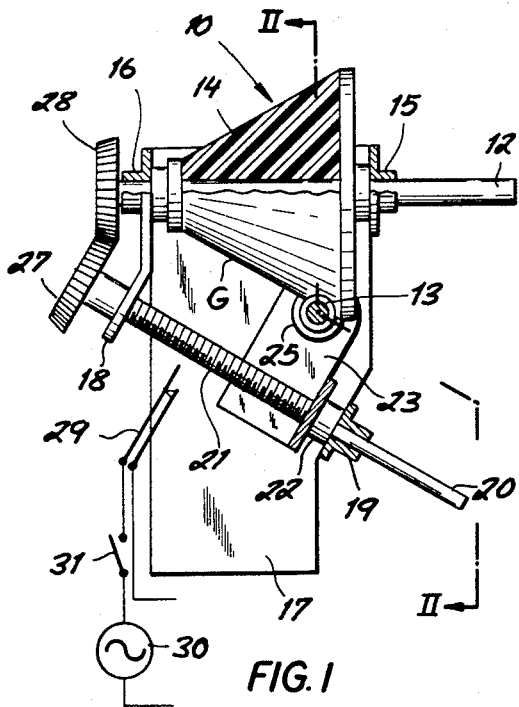
FIG. 1 is a sectional elevational view, partly in section, of a speed reducer embodying my invention.
Figure 2:
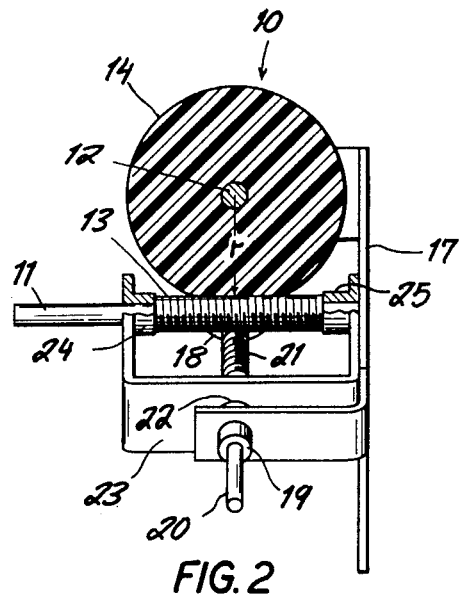
FIG. 2 is a cross-sectional view taken on the line II—II of FIG. 1.

In FIGS. 1 and 2 I have shown a speed reducer, generally designated 10, with a horizontal input shaft 11 and a horizontal output shaft 12 extending skew to each other. Shaft 11 is integral with a worm 13 whose threads bite into the surface of a frustoconical body 14 of neoprene or the like rigid with shaft 12. Body 14 is journaled in bearings 15, 16 of a supporting frame 17 which also forms bearings 18, 19 for a control shaft 20 integral with a leadscrew 21. A nut 22 engaged by leadscrew 21 is supported by a carriage 23, this carriage forming bearings 24, 25 for the worm 13. A motor 26, shown in FIG. 3, may be mounted directly on the carriage to drive the shaft 11.

Shaft 20 and leadscrew 21 extend parallel to a lower generatrix G of body 14 which passes through the point of engagement between this body and the worm 13. Rotation of the leadscrew, therefore, displaces the worm 13 along generatrix G to vary the radius r of the circle passing through the point of engagement. Since the speed ratio between input shaft 11 and output shaft 12 is determined by this radius (as well as by the pitch of the worm threads), a shift of carriage 23 toward the small end of body 14 increases this speed ratio in proportion to the carriage travel and, therefore, to the angle of rotation of leadscrew 21.

In FIG. 1 the control shaft 20 and the output shaft 12 are coupled to each other by a pair of bevel gears 27, 28 whereby leadscrew 21 is driven at the same speed as the load or, with a different gear ratio, at a speed proportional to the load speed. The chosen sense of rotation is such that, starting from the position of FIG. 1, the carriage 23 is displaced to the left so that output shaft 12 progressively accelerates if the driving speed of input shaft 11 is constant; as the rotation of the leadscrew accelerates in the same proportion, the speed of shaft 12 increases at an exponential rate. When approaching its limiting position in which the worm 13 reaches the small end of the frustocone, the carriage 23 opens a pair of switch contacts 29 in the energizing circuit of motor 26 which includes a voltage source 30 in series with a manual switch 31; thus, closure of switch 31 in the illustrated carriage position starts the output shaft 12 at low speed and progressively accelerates it until, at a predetermined speed limit, the system comes to a halt. Shaft 12 could be connected, e.g. via a one-way coupling such as an overrunning clutch, with an extension shaft bearing a pinion in mesh with a gear forming part of the load to be accelerated.

Figure 3:
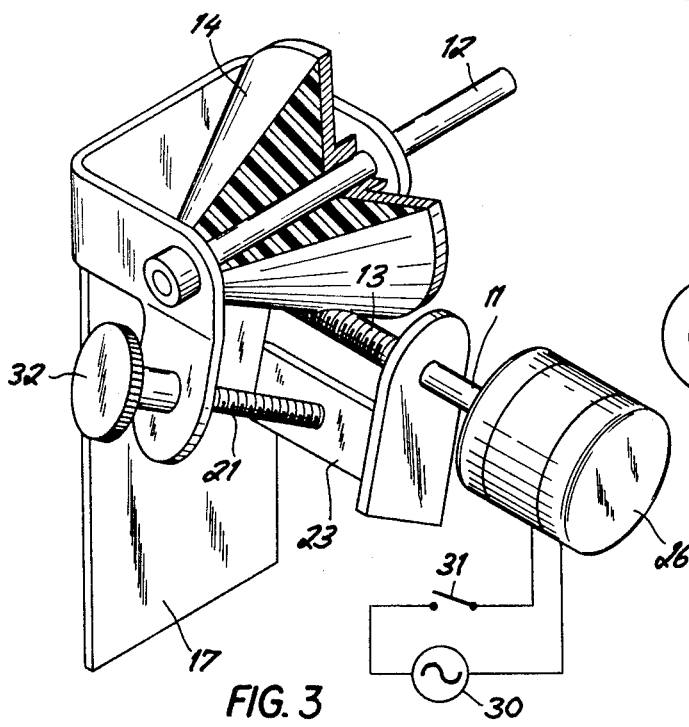
FIG. 3 is a perspective view (partly broken away) of the speed reducer of FIGS. 1 and 2 in slightly modified form.

As shown in FIG. 3, the feedback connection 27, 28 may be replaced by a knob 32 enabling manual adjustment of the position of carriage 23 by rotation of leadscrew 21 in one sense or the other.

Figure 4:
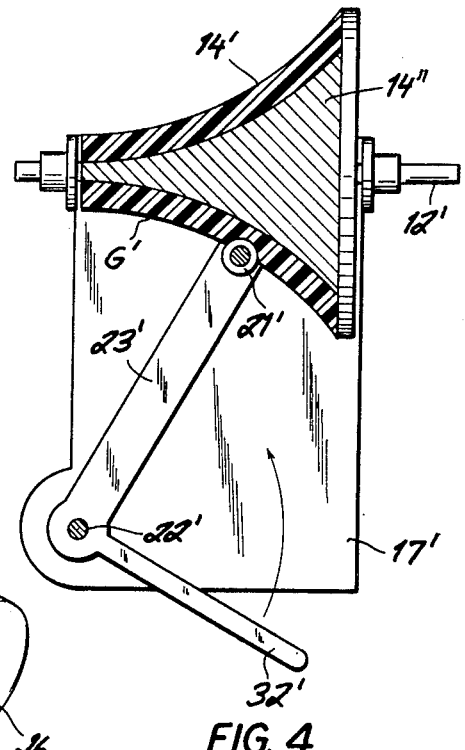
FIG. 4 is a sectional elevational view of another embodiment.

In FIG. 4 I have illustrated a modified system in which a worm 21' is journaled on an arm 23' which is pivotally mounted on a pin 22' located at the center of curvature of an arcuate generatrix G' of a neoprene body 14', this body forming a coating on a metallic core 14'' rigid with an output shaft 12'. The composite worm wheel 14', 14'' of concave peripheral surface is journaled in a frame 17' carrying the pin 22'. A handle 32' rigid with arm 23' enables the displacement of worm 21' along generatrix G'; holding arm 23' may be locked in position by suitable means not shown, e.g. a setscrew engageable with pin 22'.

Naturally, the swing of arm 23' could also be carried out automatically, e.g. by means of a transmission connecting that arm with either the input shaft or the output shaft of the speed reducer.

The frustoconical body 14 of FIG. 3 could also be made hollow and mounted on a rigid core so as to form part of a composite worm wheel, in the general manner illustrated in FIG. 4.

Since neoprene preserves its structural integrity at temperatures up to about 95° C., the speed reducer according to my invention may be used under widely varying thermal conditions. It can be built compact enough to be accommodated in a space of about 5 × 5 × 5 cm, or 2 × 2 × 2 inches, for the transmission of torques such as those required to drive motion-picture equipment, tape recorders, toys and similar devices.

The worm holder 23 or 23' and its supporting frame could also be provided with detent means for indexing the worm in a few selected positions along the generatrix of the tapering body. The worm may be made of metal or some other material substantially harder than the coacting body 14, 14'.

I claim:
1. A speed reducer comprising:
    a support;
    a tapering body of elastomeric material centered on an axis, said body being journaled on said support for rotation about said axis;
    a worm with an axis skew to the axis of said body, said worm having threads biting into said elastomeric material along a generatrix of said body;
    holding means for said worm adjustably mounted on said support with freedom of displacement of said worm parallel to itself along said generatrix; and
    control means linked with said holding means for displacing said worm to vary the speed ratio between a rotary drive means coupled with said worm and a load coupled with said body.
2. A speed reducer as defined in claim 1 wherein said generatrix is straight, said holder including a carriage movable along a line parallel to said generatrix.
3. A speed reducer as defined in claim 2 wherein said control means comprises a self-locking leadscrew, said carriage being provided with a nut matingly engaging said leadscrew.
4. A speed reducer as defined in claim 3, further comprising coupling means connecting said leadscrew with said body for progressively varying said speed ratio upon continuing rotation of said worm.
5. A speed reducer as defined in claim 1 wherein said generatrix is arcuately curved, said holder being swingable about the center of curvature of said generatrix.
6. A speed reducer as defined in claim 1 wherein said elastomeric material is neoprene.

* * * * *